United States Patent
Zhang et al.

(10) Patent No.: US 10,703,672 B2
(45) Date of Patent: *Jul. 7, 2020

(54) ARTIFICIAL GLASS SURFACE

(71) Applicant: FOSHAN YIXIN STONE CO., LTD, Foshan, Guangdong (CN)

(72) Inventors: Guoming Zhang, Guangdong (CN); Jiansong Xian, Guangdong (CN); Zhijian Liang, Guangdong (CN); Huaigui Xiao, Guangdong (CN); Weidong Cai, Guangdong (CN)

(73) Assignee: FOSHAN YIXIN STONE CO., LTD, Foshan (CN)

( * ) Notice: Subject to any disclaimer, the term of this patent is extended or adjusted under 35 U.S.C. 154(b) by 38 days.

This patent is subject to a terminal disclaimer.

(21) Appl. No.: 16/172,953

(22) Filed: Oct. 29, 2018

(65) Prior Publication Data
US 2020/0071224 A1 Mar. 5, 2020

(30) Foreign Application Priority Data
Aug. 31, 2018 (CN) .......................... 2018 1 1009508

(51) Int. Cl.
C03C 3/06 (2006.01)
C03C 14/00 (2006.01)

(52) U.S. Cl.
CPC .......... *C03C 14/004* (2013.01); *C03C 14/008* (2013.01); *C03C 2201/60* (2013.01); *C03C 2214/04* (2013.01); *C03C 2214/12* (2013.01); *C03C 2214/14* (2013.01); *C03C 2214/17* (2013.01)

(58) Field of Classification Search
CPC ....... C03C 14/004; C03C 14/008; C03C 3/06; C03C 3/076; C03C 2201/60
See application file for complete search history.

(56) References Cited

U.S. PATENT DOCUMENTS

| | | | | |
|---|---|---|---|---|
| 4,225,554 A | * | 9/1980 | Kaplan | C08L 67/06 264/328.2 |
| 4,425,287 A | * | 1/1984 | Hesse | C08J 5/24 156/275.5 |
| 5,364,672 A | * | 11/1994 | Schultze-Kraft | B29C 67/245 428/15 |
| 8,039,539 B2 | * | 10/2011 | Pfeiffer | C04B 24/42 428/405 |
| 9,617,186 B2 | * | 4/2017 | Ostendorf | C08L 83/00 |
| 2008/0296795 A1 | * | 12/2008 | Willis-Papi | B29C 67/244 264/102 |
| 2010/0184907 A1 | * | 7/2010 | Pfeiffer | C04B 24/42 524/506 |
| 2018/0319970 A1 | * | 11/2018 | Pollak | C09D 5/08 |
| 2019/0276359 A1 | * | 9/2019 | Nissila | C08G 63/83 |

* cited by examiner

*Primary Examiner* — Margaret G Moore

(57) ABSTRACT

The invention relates to the technical field of artificial stone surfaces, in particular to an artificial glass surface, which is made from the following raw materials in parts by mass: 0-30 parts of a quartz material, 40-70 parts of a glass material, 5-15 parts of a modified silicone resin, 8-15 parts of an unsaturated polyester resin, and 5-14 parts of additional raw materials. The artificial glass surface employs recycled glass material as its main stone source, which contributes the conservation of mineral resources, and reduces production costs; the product is of higher quality.

9 Claims, No Drawings

ARTIFICIAL GLASS SURFACE

CROSS-REFERENCE TO RELATED APPLICATION

This application claims priority to and benefits of Chinese Patent Application No. 201811009508.2 filed on Aug. 31, 2018, and the entire content of which is incorporated herein by reference.

FIELD OF THE INVENTION

The invention relates to the technical field of artificial stone surfaces, in particular to an artificial glass surface.

BACKGROUND OF THE INVENTION

In recent years, the manufacture and sales of artificial stones have gradually improved and matured. The term "artificial stones" usually refers to artificial stone solid surfaces, artificial quartz stones, and artificial granite stones, among others. There are many types of artificial stones, and different types of artificial stones have different components. However, most artificial quartz stones are produced using 70-95% of quartz, resin, pigments, and other additives including conditioners, adhesives or curing agents, and under vacuum, high temperature and pressure. Quartz sands and quartz powder in artificial quartz stones are produced by grinding mining products which are non-renewable. If the main stone source of artificial quartz stones is only quartz sand or quartz powder, their manufacturing cost would be high; in addition, such artificial quartz stones would have a poor decorative effect and poor material performance.

In the prior art, in order to control the production cost of artificial quartz stones and to conserve mineral resources, glass fragments are also added in production, during which they are directly mixed with quartz sand or quartz powder. However, for the glass fragments to exhibit good decorative effects and for the artificial stones produced to have good material performance, the size of the glass materials should not be too small. Glass fragments that are commonly employed have a lot of edges and corners, which leads to poor fluidity of the material. When pressed into a slate, the surface of the slate would appear uneven, or the thickness of the slate is inconsistent, which is due to uneven material texture as a result of unbalanced internal forces. The slate produced is prone to cracking or particles peeling off. Therefore, glass materials are not used as the main stone source of artificial stones in the prior art.

SUMMARY OF THE INVENTION

The objective of the present invention is to provide an artificial glass surface which employs glass fragments as its main stone source, and is better in quality.

To overcome the shortcomings of the prior art, the present invention provides an artificial glass surface, which is made from the following raw materials in parts by mass:

0-30 parts of a quartz material, 40-70 parts of a glass material, 5-15 parts of a modified silicone resin, 8-15 parts of an unsaturated polyester resin, and 5-14 parts of additional raw materials.

As an improvement of the technical solution above, the glass material is glass sand, and the glass sand has a particle size of 26-150 mesh.

As an improvement of the technical solution above, the quartz material is quartz powder, and the quartz powder has a particle size of 200-450 mesh.

As an improvement of the technical solution above, the quartz material is quartz sand, and the quartz sand has a particle size of 26-120 mesh.

As an improvement of the technical solution above, the modified silicone resin is polyorganosiloxane with a highly cross-linked network structure.

As an improvement of the technical solution above, the unsaturated polyester resin is a linear polymer compound having an ester bond and an unsaturated double bond, the linear polymer is formed by polycondensation of an unsaturated dibasic acid diol or a saturated dibasic acid unsaturated diol.

As an improvement of the technical solution above, the additional raw materials are 1-3 parts of a silane coupling agent, 1-3 parts of a curing agent, and 3-8 parts of a filler pigment.

As an improvement of the technical solution above, the silane coupling agent is γ-methacryloxypropyltrimethoxysilane.

As an improvement of the technical solution above, the curing agent is tert-butyl 2-ethylhexanoate.

Comparing with the prior art, the beneficial effects of the present application are as follows:

The present invention has disclosed an artificial glass surface. The main stone source of the artificial glass surface is a glass material. In order to tackle the issue of poor fluidity of the large amount of glass material during preparation, a modified silicone resin and an unsaturated polyester resin are included in the raw materials. The glass material is the main stone source; the modified silicone resin acts a wrap to cover the surfaces of the glass fragments, reducing surface tension, thereby increasing the fluidity of the glass fragments. An addition reaction system is designed, and the polymer with a cross-linked network structure is formed by reacting a vinyl group connected to the silicon atom of the modified silicone resin with styrene in the unsaturated polyester resin. In this way, the glass material can be firmly bonded to the product, any cracking or the falling off of glass particles can be avoided. In addition, the amount of each of the raw materials of the glass surface is further optimized, allowing the production of artificial glass surfaces using recyclable waste glass materials as their main stone source. The present invention overcomes the problems of uneven surface, inconsistent thickness, prone to cracking or particles peeling off due to poor fluidity of the material caused by the large number of edges and corners present in glass fragments. Furthermore, glass can be recycled and used in the production of artificial stones; this contributes to the conservation of mineral resources and reduces the production cost of artificial stones. This method thus has considerable social significance. In addition, the artificial glass surface of this invention is a food grade product and is environmentally friendly.

DETAILED DESCRIPTION OF THE ILLUSTRATED EMBODIMENTS

To more clearly illustrate the aims, technical solutions, and beneficial effects of the present invention, the present invention is further described in detail below.

The present invention provides an artificial glass surface, which is made from the following raw materials in parts by mass:

0-30 parts of a quartz material, 40-70 parts of a glass material, 5-15 parts of a modified silicone resin, 8-15 parts of an unsaturated polyester resin, and 5-14 parts of additional raw materials.

Preferably, the artificial glass surface is made from the following raw materials in parts by mass:

10-20 parts of the quartz material, 50-65 parts of the glass material, 6-12 parts of the modified silicone resin, 10-15 parts of the unsaturated polyester resin, and 7-12 parts of the additional raw materials.

More preferably, the artificial glass surface is made from the following raw materials in parts by mass:

15-20 parts of the quartz material, 55-60 parts of the glass material, 8-10 parts of the modified silicone resin, 10-12 parts of the unsaturated polyester resin, and 8-10 parts of the additional raw materials.

In the compositions above, the glass material is the main material, which may be supplemented with a quartz material; the quartz material is quartz powder or quartz sand. The particle size of the quartz powder is 200-450 mesh, and the particle size of the quartz sand is 26-120 mesh. The glass material is glass sand, its particle size is 26-150 mesh. By selecting glass material and quartz material of these sizes, the fluidity of the artificial glass surface during its production can be further improved, and the product is of better quality. Therefore, it is vital to further limit the particle sizes of the glass material and the quartz material in order to improve the quality of the artificial glass surfaces.

It should be noted that the combinations of particle sizes of the glass material and the quartz material may be any random combinations, although the overall effect is better when the particle size of the glass material is large and the particle size of the quartz powder is small. If the particle size of the glass sand is greater than 150 mesh, more resin is required for pressing and leveling. If the particle size of the glass sand is less than 26 mesh, the glass surface would appear uneven. If the particle size of the quartz powder is greater than 450 mesh, it is too small, and the particles are prone to cluster during mixing, causing inconveniences in operation. If the particle size of the quartz powder is less than 200 mesh, it is quartz sand. In this invention, quartz sand can also be added, but its amount should be controlled within 30 parts, otherwise too little glass material is used, which does not contribute to mineral resource conservation.

It should be noted that the source of the glass sand is glass fragments. Glass sand is glass fragments sieved into different particle sizes.

In the compositions above, the modified silicone resin is polyorganosiloxane with a highly cross-linked network structure. This compound contains more vinyl groups connecting to the silicon atoms of the silicone resin. These vinyl groups react with styrene in the unsaturated polyester resin to form a polymer with a more extensive network structure, thereby further increasing the adhesion between the glass material and the artificial glass surface body, preventing particles from peeling off. The quality of the artificial glass surface product is thus further improved.

It should be noted that the modified silicone resin is a highly cross-linked macromolecule formed by polymerization of organosiloxane small molecules via the sol-gel process. Preferably, in this method, the gelling time is 10-120 minutes; the temperature is 200-220 degrees Celsius. These conditions ensure the formation of polyorganosiloxane with a highly cross-linked network structure.

In the compositions above, the unsaturated polyester resin is a linear polymer compound having an ester bond and an unsaturated double bond. The linear polymer is formed by polycondensation of an unsaturated dibasic acid diol or a saturated dibasic acid unsaturated diol. The linear polymer compound contains some styrene, which rapidly reacts with vinyl groups connected to silicon atoms of the modified silicone resin via addition reactions, thereby increasing the reaction rate and promoting rapid formation of the polymer with a network structure.

Specifically, the unsaturated polyester resin is 721-9 resin from Nantong Tianhe Resin Co., Ltd., but other unsaturated polyester resins having an ester bond and an unsaturated double bond are all within the scope of the present invention.

A modified silicone resin and an unsaturated polyester resin are used in this invention. The synergistic action of the two gives a good adhesive effect, and the glass surface product is denser and more uniform. The increased adhesion between the glass material and the artificial glass surface body effectively prevents particles from peeling off. As a result, the artificial glass surface product is of better quality.

The modified silicone resin and the unsaturated polyester resin of the present invention are food grade and environmentally friendly materials. They do not contain any metals. They provide strong adhesion effects which allow the production of high quality, food grade, and environmentally friendly artificial glass surface products.

In the compositions above, the additional raw materials are 1-3 parts of a silane coupling agent, 1-3 parts of a curing agent, and 3-8 parts of a filler pigment. After the curing agent and the silane coupling agent are added according to the ratio specified, the fluidity of the glass materials during the preparation of the artificial glass surface is maintained at a good level, curing speed and the integrity of the artificial glass surface are greatly improved.

Specifically, the silane coupling agent is γ-methacryloxypropyltrimethoxysilane. The technical solution of the present invention includes a large amount of glass material. An ordinary coupling agent may not satisfy the level of adhesion required for the artificial glass surface. Insufficient adhesion leads to a decreased fluidity of the glass material, and the glass material is prone to fall off. Therefore, the silane coupling agent mentioned above is employed for its better filling and tacking abilities in inorganic materials. After a series of experiments, γ-methacryloxypropyltrimethoxy was found to be the best silane coupling agent for the present invention.

Specifically, the curing agent is tert-butyl 2-ethylhexanoate peroxide, which can be combined with additional raw materials to achieve good curing results during the production of artificial glass surfaces.

Furthermore, the method for preparing the artificial glass surface of the present invention is as follows:

A. Adding the glass material and the silane coupling agent into a trough, stirring and mixing thoroughly to obtain an initial glass material mixture;

Preferably, the stirring and mixing of step A involve stirring at low speeds for 1-5 minutes.

B. Heating the silicone resin to 30-50° C.; adding the heated silicone resin into the trough; stirring and mixing the heated silicone resin with the initial glass material mixture thoroughly to obtain a secondary glass material wrapper;

Preferably, the stirring and mixing in step B involve stirring at low speeds for 3-10 minutes followed by stirring at high speeds for 1-5 minutes.

C. Adding the unsaturated polyester resin, the curing agent, the filler pigment, and the quartz material to the secondary glass material wrapper in the trough; stirring and mixing thoroughly to obtain a glass surface premade material;

Preferably, the stirring and mixing in step C involve stirring at low speeds for 1-5 minutes followed by stirring at high speeds for 1-3 minutes.

D. Placing the glass surface premade material in a mold frame, pressing to form a pre-fired surface; placing the pre-fired surface in a curing oven to cure at 100-150° C. to obtain the artificial glass surface.

The present invention is explained in more detail in the following embodiments.

I. Formulation: the components of the embodiments are as shown in Table 1 below, wherein:

The glass material is glass sand, its particle size is 80 mesh;

The quartz material is quartz powder, its particle size is 325 mesh;

The modified silicone resin is polyorganosiloxane with a highly cross-linked network structure. It is purchased from Shenzhen Ji-Peng Silicon Fluoride Materials Co., Ltd., its product number is SH-9502;

The unsaturated polyester resin is a linear polymer compound formed by polycondensation of an unsaturated dibasic acid diol or a saturated dibasic acid unsaturated diol. The unsaturated polyester resin is purchased from Nantong Tianhe Resin Co., Ltd., its product number is 721-9.

The silane coupling agent is γ-methacryloxypropyltrimethoxysilane, which is purchased from GBXF Silicones Co., Ltd, its product number is GX570.

The curing agent is tert-butyl 2-ethylhexanoate peroxide, which is purchased from Lianyungang Sino More New Material Co., Ltd., its product number is V8.

II. Preparation Method

A. Adding the glass material and the silane coupling agent into a trough, stirring at low speeds for 1 minute until thoroughly mixed to obtain an initial glass material mixture;

B. Heating the silicone resin to 40° C.; adding the heated silicone resin into the trough; stirring first at low speeds for 5 minutes and then at high speeds for 2 minutes to thoroughly mix with the initial glass material mixture in order to obtain a secondary glass material wrapper;

C. Adding the unsaturated polyester resin, the curing agent, the filler pigment, and the quartz material to the secondary glass material wrapper in the trough; stirring first at low speeds for 3 minutes, then at high speeds for 2 minutes until thoroughly mixed to obtain a glass surface premade material;

D. Placing the glass surface premade material in a mold frame, pressing to form a pre-fired surface; placing the pre-fired surface in a curing oven to cure at 120° C. to obtain the artificial glass surface.

Following the components and preparation methods stated above, the amount of each component is adjusted in other embodiments to obtain different glass surfaces (see Table 1, the amount of each component listed in Table 1 are all expressed in parts by mass). The qualities of the products obtained are compared in Table 2 below.

TABLE 1

| Embodiments | Quartz material | Glass material | Modified silicone resin | Unsaturated polyester resin | Silane coupling agent | Curing agent | Filler pigment |
| --- | --- | --- | --- | --- | --- | --- | --- |
| 1 | 0 | 70 | 10 | 10 | 2 | 2 | 5 |
| 2 | 15 | 40 | 10 | 10 | 2 | 2 | 5 |
| 3 | 30 | 40 | 10 | 10 | 2 | 2 | 5 |
| 4 | 15 | 55 | 10 | 10 | 2 | 2 | 5 |
| 5 | 15 | 70 | 10 | 10 | 2 | 2 | 5 |
| 6 | 15 | 80 | 10 | 10 | 2 | 2 | 5 |
| 7 | 15 | 80 | 15 | 15 | 2 | 2 | 5 |
| 8 | 15 | 55 | 5 | 10 | 2 | 2 | 5 |
| 9 | 15 | 55 | 15 | 10 | 2 | 2 | 5 |
| 10 | 15 | 55 | 20 | 10 | 2 | 2 | 5 |
| 11 | 15 | 55 | 0 | 10 | 2 | 2 | 5 |
| 12 | 15 | 55 | 10 | 5 | 2 | 2 | 5 |
| 13 | 15 | 55 | 10 | 15 | 2 | 2 | 5 |
| 14 | 15 | 55 | 10 | 0 | 2 | 2 | 5 |
| 15 | 15 | 55 | 10 | 20 | 2 | 2 | 5 |
| 16 | 15 | 55 | 10 | 20 | 1 | 2 | 5 |
| 17 | 15 | 55 | 10 | 20 | 3 | 2 | 5 |
| 18 | 15 | 55 | 10 | 20 | 0 | 2 | 5 |
| 19 | 15 | 55 | 10 | 20 | 5 | 2 | 5 |
| 20 | 15 | 55 | 10 | 20 | 2 | 1 | 5 |
| 21 | 15 | 55 | 10 | 20 | 2 | 3 | 5 |
| 22 | 15 | 55 | 10 | 20 | 2 | 0 | 5 |
| 23 | 15 | 55 | 10 | 20 | 2 | 5 | 5 |
| 24 | 20 | 52 | 10 | 10 | 2 | 2 | 4 |

TABLE 2

| Embodiments | Product testing results |
| --- | --- |
| 1 | Flat surface, no cracking, no glass material falling off |
| 2 | Flat surface, no cracking, no glass material falling off |
| 3 | Flat surface, no cracking, no glass material falling off |
| 4 | Flat surface, no cracking, no glass material falling off |
| 5 | Flat surface, no cracking, no glass material falling off |
| 6 | Flat surface, cracking, glass material falling off |
| 7 | Flat surface, cracking, glass material falling off |
| 8 | Flat surface, no cracking, no glass material falling off |
| 9 | Flat surface, no cracking, no glass material falling off |
| 10 | No cracking, no glass material falling off, curing time is too long, uncontrollable texture on the surface |
| 11 | Uneven surface, cracking, glass material falling off |
| 12 | Flat surface, no cracking, no glass material falling off |
| 13 | Flat surface, no cracking, no glass material falling off |
| 14 | Uneven surface, cracking, glass material falling off |
| 15 | Uneven surface, cracking, glass material falling off |
| 16 | Flat surface, no cracking, no glass material falling off |
| 17 | Flat surface, no cracking, no glass material falling off |
| 18 | Flat surface, no cracking, no glass material falling off |
| 19 | Flat surface, no cracking, no glass material falling off |

TABLE 2-continued

| Embodiments | Product testing results |
|---|---|
| 20 | Flat surface, no cracking, no glass material falling off |
| 21 | Flat surface, no cracking, no glass material falling off |
| 22 | Flat surface, no cracking, no glass material falling off, curing time is too long |
| 23 | Flat surface, no cracking, no glass material falling off |
| 24 | Flat surface, no cracking, no glass material falling off |

In the embodiments above, the amount of the quartz material is limited to 0-30 parts, so that unlike the prior art, the main stone source of the artificial glass surface is glass material instead of quartz sand or quartz powder.

As shown in embodiments 1-7 in the tables above, when the amount of other components is unchanged, an amount of glass material within the range of 40-70 parts ensures that the surface of the product is flat with no cracking, and the glass material does not fall off.

As shown in embodiments 4 and 8-11 in the tables above, when the amount of other components is unchanged, an amount of the modified silicone resin within the range of 5-10 parts ensures that the surface of the product is flat with no cracking, and the glass material does not fall off.

As shown in embodiments 4 and 12-15 in the tables above, when the amount of other components is unchanged, an amount of the unsaturated polyester resin within the range of 5-10 parts ensures that the surface of the product is flat with no cracking, and the glass material does not fall off.

As shown in embodiments 16-23 in the tables above, when the amount of other components is unchanged, an amount of the silane coupling agent and an amount of curing agent within the range of 1-3 parts ensure that the surface of the product is flat with no cracking, and the glass material does not fall off.

As shown in embodiments 18 and 22 in the tables above, when the amounts of the additional components are unchanged, an amount of the modified silicone resin and an amount of unsaturated polyester resin within the claimed ranges ensure that the surface of the product is flat with no cracking, and the glass material does not fall off.

Embodiment 24 is the most preferred embodiment of the present application. The amount of filler pigment determines the color of the product; it is not related to quality indicators such as flatness, cracking and the falling off of the glass material. The amount of filler pigment can be determined according to practical color requirements.

Technical tests performed on the artificial glass surfaces and the results are shown in Table 3.

TABLE 3

| Number | Test items | Test methods | Results |
|---|---|---|---|
| 1 | Wear resistance | ASTM C241/C241M-15ε1 | 29.1 |
| 2 | Bending strength | ASTM C880/C880M-15 | Dry: 59.5 MPa Wet: 65.8 MPa |
| 3 | Impact resistance | EN 14617-9: 2005 | 15.30 J |
| 4 | Compressive strength | ASTM C170/C170M-17 | Dry: 231.9 MPa Wet: 232.6 MPa |
| 5 | Water absorption ratio and specific gravity | ASTM C97/C97M-18 | Water absorption ratio: 0.03% Density: 2.20 |
| 6 | Pollution resistance | ANSI Z124.6-2007 Section 5.2 | Pollution resistance level: 53 Maximum contamination depth: 0.03 mm |

From the results above, it can be concluded that the artificial glass surface of the invention has good wear resistance, good impact resistance, high bending strength, high compressive strength, low water absorption ratio and good pollution resistance.

Concluding from the embodiments above, the present invention has disclosed an artificial glass surface. The main stone source of the artificial glass surface is a glass material. In order to reduce the poor fluidity of the large amount of glass material during preparation, a modified silicone resin and an unsaturated polyester resin are included in the raw materials. The glass material is the main stone source; the modified silicone resin acts as a wrap to cover the surfaces of the glass fragments, reducing surface tension, thereby increasing the fluidity of the glass fragments. An addition reaction system is designed, and the polymer with a cross-linked network structure is formed by reacting a vinyl group connected to the silicon atom of the modified silicone resin with styrene in the unsaturated polyester resin. In this way, the glass material can be firmly bonded to the product, any cracking or the falling off of glass particles can be avoided. In addition, the amount of each of the raw materials of the glass surface is further optimized, allowing the production of artificial glass surfaces using recyclable waste glass materials as their main stone source. The present invention overcomes the following problems including uneven surface, inconsistent thickness, prone to cracking or particles peeling off due to poor fluidity of the material caused by the large number of ledges and corners present in glass fragments. Furthermore, glass can be recycled and used in the production of artificial stones; this contributes to the conservation of mineral resources and reduces the production cost of artificial stones. This method thus has considerable social significance. In addition, the artificial glass surface of this invention is a food grade product and is environmentally friendly.

The disclosure above is only preferred embodiments of the present invention, and is not intended to limit the scope of the present invention. Equivalent changes based on the claims of the present invention are still within the scope of the present invention.

What is claimed is:

1. An artificial glass surface, characterized in that it is made from the following raw materials in parts by mass: 0-30 parts of a quartz material, 40-70 parts of a glass material, 5-15 parts of a silicone resin, 8-15 parts of an unsaturated polyester resin, and 5-14 parts of additional raw materials.

2. The artificial glass surface according to claim 1, characterized in that the glass material is glass sand, the glass sand has a particle size of 26-150 mesh.

3. The artificial glass surface according to claim 1, characterized in that the quartz material is quartz powder, the quartz powder has a particle size of 200-450 mesh.

4. The artificial glass surface according to claim 1, characterized in that the quartz material is quartz sand, the quartz sand has a particle size of 26-120 mesh.

5. The artificial glass surface according to claim 1, characterized in that the silicone resin is polyorganosiloxane with a cross-linked network structure.

6. The artificial glass surface according to claim 1, characterized in that the unsaturated polyester resin is a linear polymer compound having an ester bond and an unsaturated double bond, the linear polymer compound is formed by polycondensation of an unsaturated dibasic acid diol or a saturated dibasic acid unsaturated diol.

7. The artificial glass surface according to claim 1, characterized in that the additional raw materials are 1-3 parts of a silane coupling agent, 1-3 parts of a curing agent, and 3-8 parts of a filler pigment.

8. The artificial glass surface according to claim 7, characterized in that the silane coupling agent is γ-methacryloxypropyltrimethoxysilane.

9. The artificial glass surface according to claim 7, characterized in that the curing agent is tert-butyl 2-ethylhexanoate.

* * * * *